United States Patent
Koizumi et al.

(10) Patent No.: US 8,693,898 B2
(45) Date of Patent: Apr. 8, 2014

(54) ADAPTIVE EQUALIZER, OPTICAL RECEIVER, AND TAP COEFFICIENT CORRECTING METHOD

(75) Inventors: Nobukazu Koizumi, Kawasaki (JP); Kazuhiko Hatae, Kawasaki (JP); Noriyasu Nakayama, Kawasaki (JP); Koji Nakamuta, Kawasaki (JP); Hisao Nakashima, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 13/317,297

(22) Filed: Oct. 14, 2011

(65) Prior Publication Data
US 2012/0134684 A1  May 31, 2012

(30) Foreign Application Priority Data
Nov. 30, 2010  (JP) ................... 2010-267557

(51) Int. Cl.
*H04B 10/06* (2011.01)
(52) U.S. Cl.
USPC ........... 398/208; 398/202; 398/209; 398/204; 398/205; 398/206; 398/135; 398/136; 398/65; 398/33; 398/158; 398/159; 375/232; 375/235; 375/229
(58) Field of Classification Search
USPC ......... 398/202, 204, 205, 208, 209, 214, 152, 398/65, 135, 136, 147, 158, 159, 161, 33, 398/206, 210; 375/232, 235, 229
See application file for complete search history.

(56) References Cited

U.S. PATENT DOCUMENTS

| 8,478,135 B2 * | 7/2013 | Xie ............................... 398/208 |
| 8,515,293 B2 * | 8/2013 | Yasuda et al. ................ 398/208 |
| 2009/0245816 A1 | 10/2009 | Liu et al. |

FOREIGN PATENT DOCUMENTS

JP  2009-253972  10/2009

OTHER PUBLICATIONS

D. Ly-Gagnon et al., "Coherent Detection of Optical Quadrature Phase-Shift Keying Signals With Carrier Phase Estimation", IEEE JLT, vol. 24, 2006, pp. 12-21.

* cited by examiner

*Primary Examiner* — Hanh Phan
(74) *Attorney, Agent, or Firm* — Staas & Halsey LLP

(57) ABSTRACT

An adaptive equalizer includes a finite impulse response filter with a predetermined number of taps; and a tap coefficient adaptive controller having a register to hold tap coefficients for the filter, a weighted center calculator to calculate a weighted center of the tap coefficients, and a tap coefficient shifter to shift the tap coefficients based on a calculation result of the weighted center. During an initial training period, the tap coefficient shifter shifts the tap coefficients on a symbol data basis such that a difference between the calculated weighted center of the tap coefficients and a tap center defined by the number of taps is minimized.

20 Claims, 14 Drawing Sheets

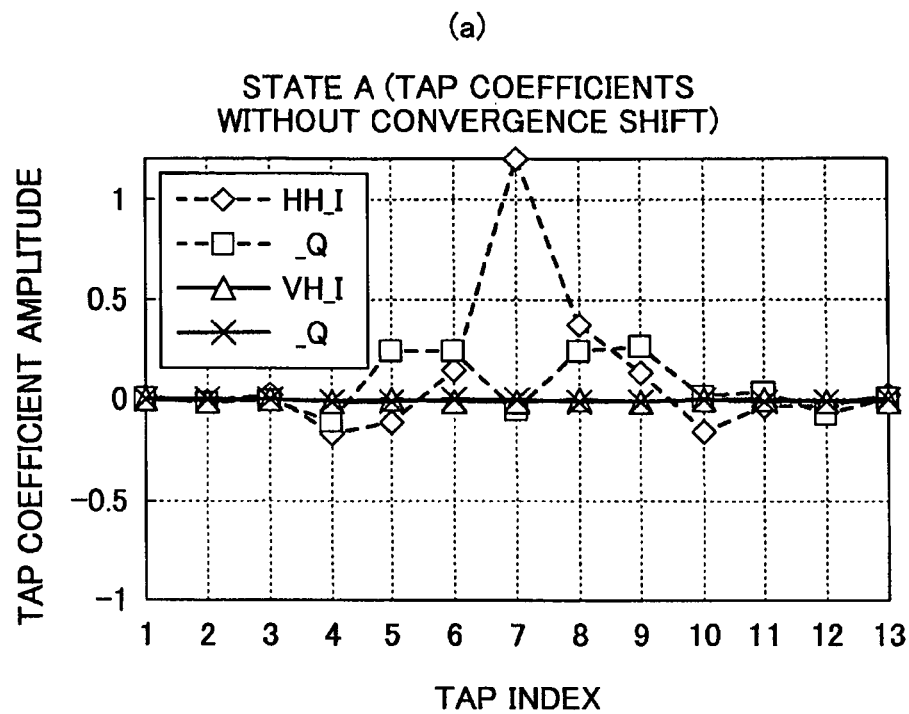
FIG.1A
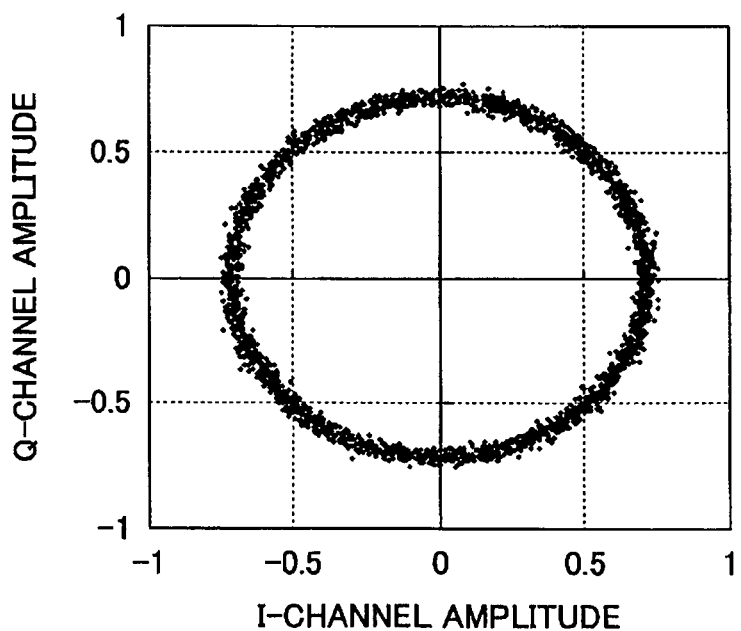

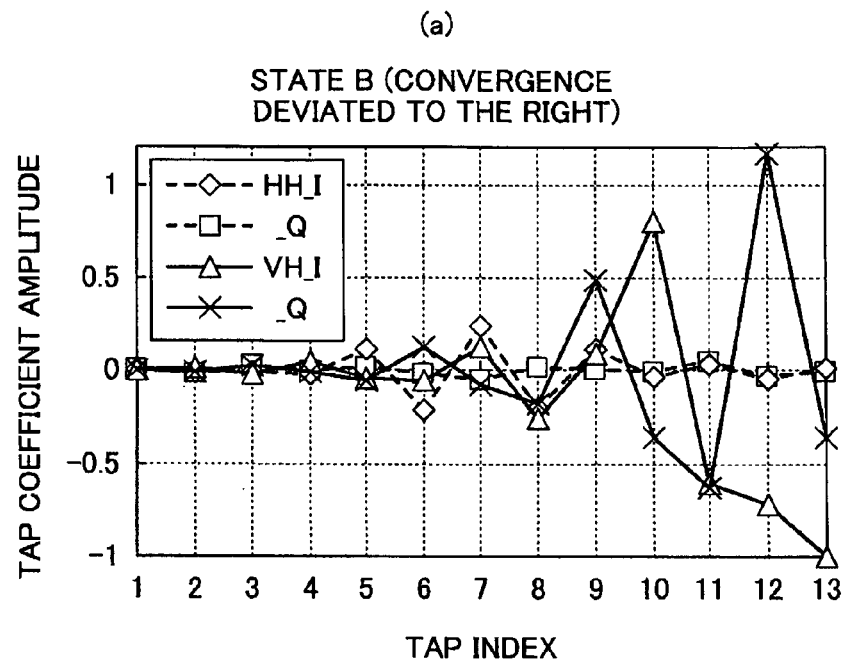
FIG.1B
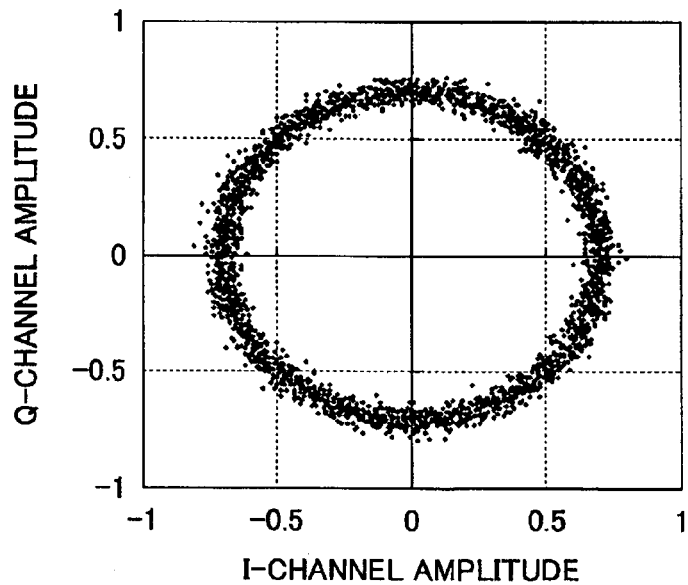

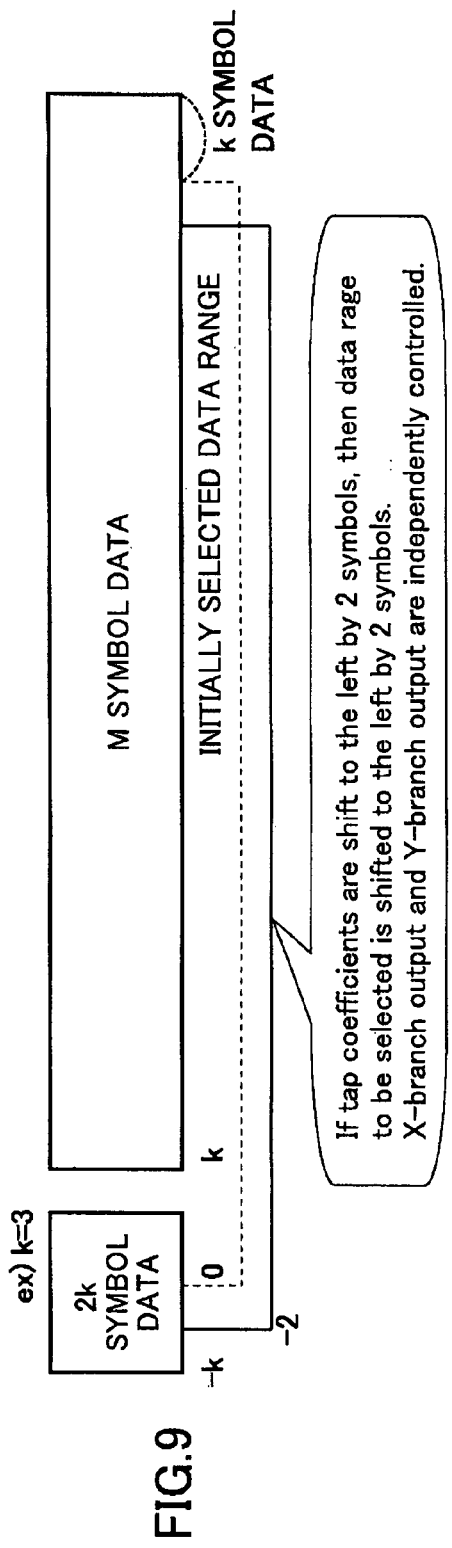

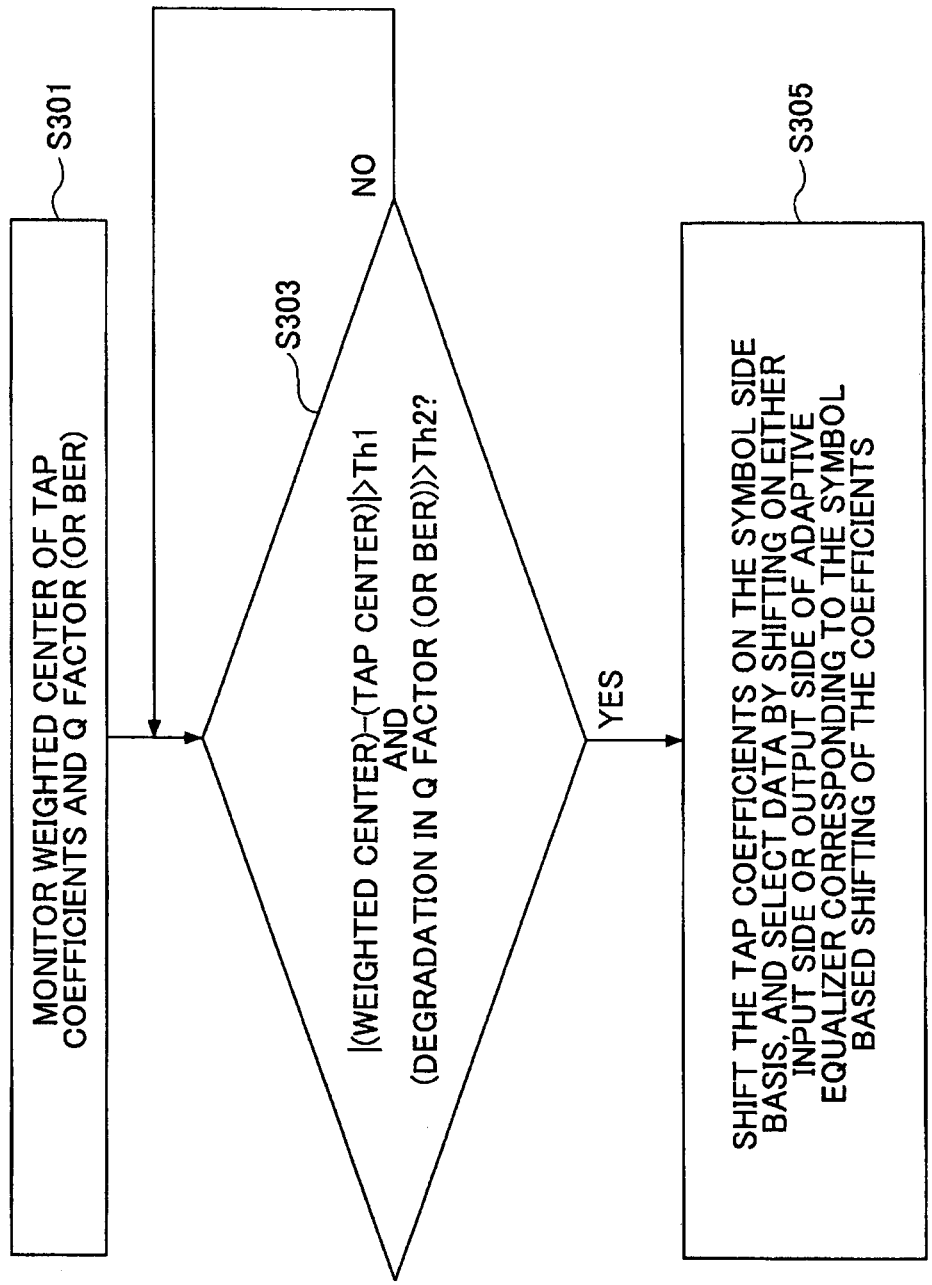

ADAPTIVE EQUALIZER, OPTICAL RECEIVER, AND TAP COEFFICIENT CORRECTING METHOD

CROSS REFERENCE TO RELATED APPLICATIONS

This application is based upon and claims the benefit of priority of the prior Japanese Patent Application No. 2010-267557 filed on Nov. 30, 2010, the entire contents of which are incorporated herein by reference.

FIELD

The embodiments discussed herein relate to an adaptive equalizer, an optical receiver, and a tap coefficient correcting method for adaptive equalizers.

BACKGROUND

Due to widely spreading new services such as distribution of video pictures making use of cloud computing on the Internet, communication traffic is expected to rapidly increase. In order to deal with the continuously increasing communication traffic, research and studies are made on optical transmitters and receivers capable of signal transmission at a rate of 100 Gbps or more.

However, if the bit rate per wavelength is increased, the signal quality is degraded due to degradation of the optical signal to noise ratio (OSNR) performance or waveform distortion caused by wavelength dispersion, polarization mode dispersion or nonlinear effects in the transmission path. Addressing this issue, in recent years and continuing, digital coherent receiving technology is attracting much attention because of superiority in OSNR performance and resistance to waveform distortion. (See, for example, Non-patent Document 1 listed below).

With a digital coherent receiving technique, OSNR performance is improved, and compensation for waveform distortion and adaptive equalization with respect to time-varying propagation characteristic of optical transmission paths can be realized using a digital signal processor. Accordingly, high performance can be maintained even in high-bit-rate transmission. Unlike conventional intensity-modulated direct detection allocating on/off states of light intensity to a binary signal, a coherent receiving technique extracts intensity and phase information and quantizes the extracted intensity and phase information at an analog-to-digital (A/D) converter. The quantized information is demodulated at a digital signal processor.

When DP-QPSK (dual polarization—quadrature phase shift keying) is employed as a phase modulation scheme, two-bit data states are allocated to four optical phases (0°, 90°, 180°, and 270° for each of two orthogonal polarized waves (polarized along the x axis and the y axis). The symbol rate can be reduced to ¼, and accordingly, the system can be made smaller and the cost can be reduced.

A light signal having been propagated through an optical fiber is separated into horizontal polarization component (H-axis polarization) and vertical polarization component (V-axis polarization) before the light signal is input to a digital signal processor. Each of the H-axis and V-axis polarization components is detected by a local oscillating laser with 90-degree phase shift, separated into an in-phase channel and a quadrature channel, and subjected to analog-to-digital (A/D) conversion. Because transmission-side polarization along the X axis and the Y axis is not in accord with receiving-side polarization along the horizontal axis (H axis) and the vertical axis (V axis), and because polarization mode dispersion exists in optical fibers, X and Y components of the transmitted signal are generally mixed into the H and V components of the received signal. The X component and the Y component of the transmission signal are separated from the H component and the V component of the received signal by an adaptive equalized of a digital signal processor. The adaptive equalizer also equalizes waveform distortion caused by band limitation due to wavelength division multiplexing, polarization mode dispersion or residual wavelength dispersion (which is a residual component of waveform distortion compensation).

Since propagation characteristics of an optical fiber change due to vibration or temperature change, adaptive equalization is demanded not only in the initial training period, but also during communications (data transmission). Accordingly, tap coefficients are calculated and updated taking as many input signals and output signals as required into calculation so as to satisfy the necessary follow-up rate (the maximum of characteristic changing rate of transmission path).

In order to prevent the X-branch and the Y-branch from converging to the same information source, it is proposed to calculate filter coefficients by generating a new set of filter coefficients for one of the X and Y branches based upon the output of filter coefficients of the other branch. (See, for example, Patent Document 1). With this method, a symmetry center of the filter coefficients of one of the branches is calculated, and the filter coefficients are folded back at the symmetry center. Then complex conjugate permutation is performed on the filter coefficients having been subjected to the foldback process to acquire a new set of filter coefficient for the other branch. When calculating the symmetry center, centers of electric power of the Hxx filter and the Hyx filter are calculated respectively, and the average of the centers of electric power is selected as the symmetry center.

Patent Document 1:
Japanese Laid-Open Patent Publication No. 2009-253972
Non-Patent Document 1:
D. Ly-Gagnon, IEEE JLT, vol. 24, pp. 12-21, 2006

SUMMARY

According to one aspect of the present disclosure, an adaptive equalizer includes:

a finite impulse response filter with a predetermined number of taps; and a tap coefficient adaptive controller having a register to hold tap coefficients for the filter, a weighted center calculator to calculate a weighted center of the tap coefficients, and a tap coefficient shifter to shift the tap coefficients based on a calculation result of the weighted center, the tap coefficient shifter being configured, during an initial training period, to shift the tap coefficients on a symbol data basis so as to minimize a difference between the calculated weighted center of the tap coefficients and a tap center defined by the number of taps.

According to another aspect of the present disclosure, an adaptive equalizer includes:

a finite impulse response filter with a predetermined number of taps; and a tap coefficient adaptive controller having a register to hold tap coefficients for the filter, a weighted center calculator to calculate a weighted center of the tap coefficients, and a tap coefficient shifter to shift the tap coefficients based on a calculation result of the weighted center, the tap coefficient shifter being, configured, if a difference between the calculated weighted center of the tap coefficients and a tap center determined by the number of taps exceeds a predetermined threshold value during communications after the initial training period, to shift the tap coefficients on a symbol data basis so as to bring the weighted center of the tap coefficients close to the tap center.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1A is a diagram for explaining an issue of deviation of convergence of tap coefficients in an adaptive equalizer of an optical receiver, illustrating an appropriately converged state A of tap coefficients without shifting;

FIG. 1B is a diagram for explaining an issue of deviation of convergence of tap coefficients in an adaptive equalizer of an optical receiver, illustrating the state B in which the convergence of tap coefficients has deviated from the tap center to one side;

FIG. 9 illustrates an example of correction of tap coefficients during communications according to Embodiment 2, illustrating selection of output data from the adaptive equalizer;

FIG. 10 illustrates an example of correction of tap coefficient during communications according to Embodiment 2, illustrating selection of output data from the adaptive equalizer;

FIG. 14 illustrates a modification of the tap coefficient correcting method illustrated in FIG. 8.

DESCRIPTION OF EMBODIMENTS

Figure 2:
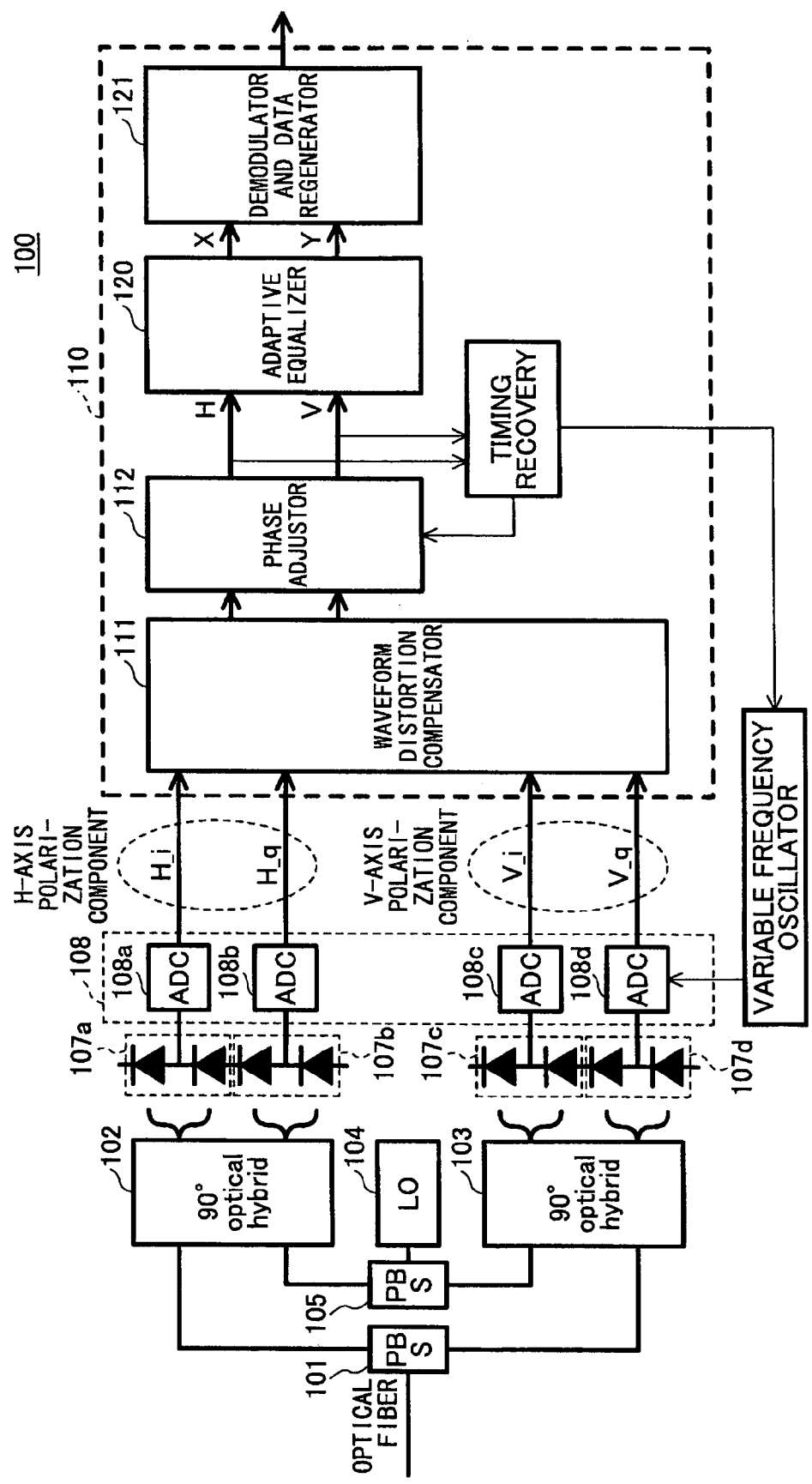
FIG. 2 illustrates an example of a digital coherent optical receiver according to an embodiment.

The embodiments are described below with reference to the appended drawings.

FIG. 1A and FIG. 1B are diagrams for explaining an issue of deviation of convergence of tap coefficients occurring in the initial training period of an adaptive equalizer of an optical receiver. FIG. 1A illustrates appropriately converged state A of tap coefficients of an adaptive equalizer without deviation, and FIG. 1B illustrates deviated state B in which the tap coefficients are converged, but the convergence has deviated from the tap center to the right.

In FIG. 1A, the number of taps N of a filter is thirteen (N=13) as illustrated in graph (a). The peak of the tap coefficients appears at tap index 7, and non-zero components of tap coefficient amplitudes are distributed symmetrically with respect to the peak position. In this case, the output of the adaptive equalizer is well-equalized as illustrated in graph (b).

However, the convergence of the tap coefficients may deviate from the tap center toward either side (e.g., toward the larger tap index) in the initial training period, depending on the noise state of received signals, or polarization mode dispersion or rotation of polarization plane in an optical fiber, as illustrated in graph (a) of FIG. 1B. In this case, the output of the adaptive equalizer contains noise components due to residue of equalization, as illustrated in graph (b). The noise components cause the bit error rate to increase. The reason why the residue of equalization remains in state B is that residual components (such as residual dispersion) cannot be equalized unless there are several taps of margins provided on both sides of the peak position of the tap coefficients.

The similar issue arises during actual communications. If the polarization mode dispersion of the optical fiber becomes large during communications, the rotational state of the polarization plane changes due to vibration or temperature change, and the convergence of the tap coefficients may vary from state A illustrated in FIG. 1A to state B illustrated in FIG. 1B. In this case, stable equalization cannot be guaranteed.

This issue may be solved by increasing the number of taps N. However, since the sampling rate of A/D conversion is high in digital coherent optical transmission, parallel processing is employed to appropriately carry out digital processing. If 2 to 1 reduction is performed at the adaptive equalizer, 2×M sample data items are input in parallel to the M-parallel filters to acquire M parallel outputs. Because parallel processing makes the circuit scale large, it is desired to set the number of taps N as small as possible. If the number of taps is increased in a parallel processing circuit, not only the circuit scale, but also difficulty in implementation increases, which results in undesired increase of the cost and the period of development.

Accordingly, the embodiments discussed below provide a tap coefficient correcting method capable of maintaining stable equalization during both the initial training period and actual communications, while maintaining the implementable number of taps. The embodiments also provide an adaptive equalizer and an optical receiver that carry out the tap coefficient correcting method.

Figure 3:
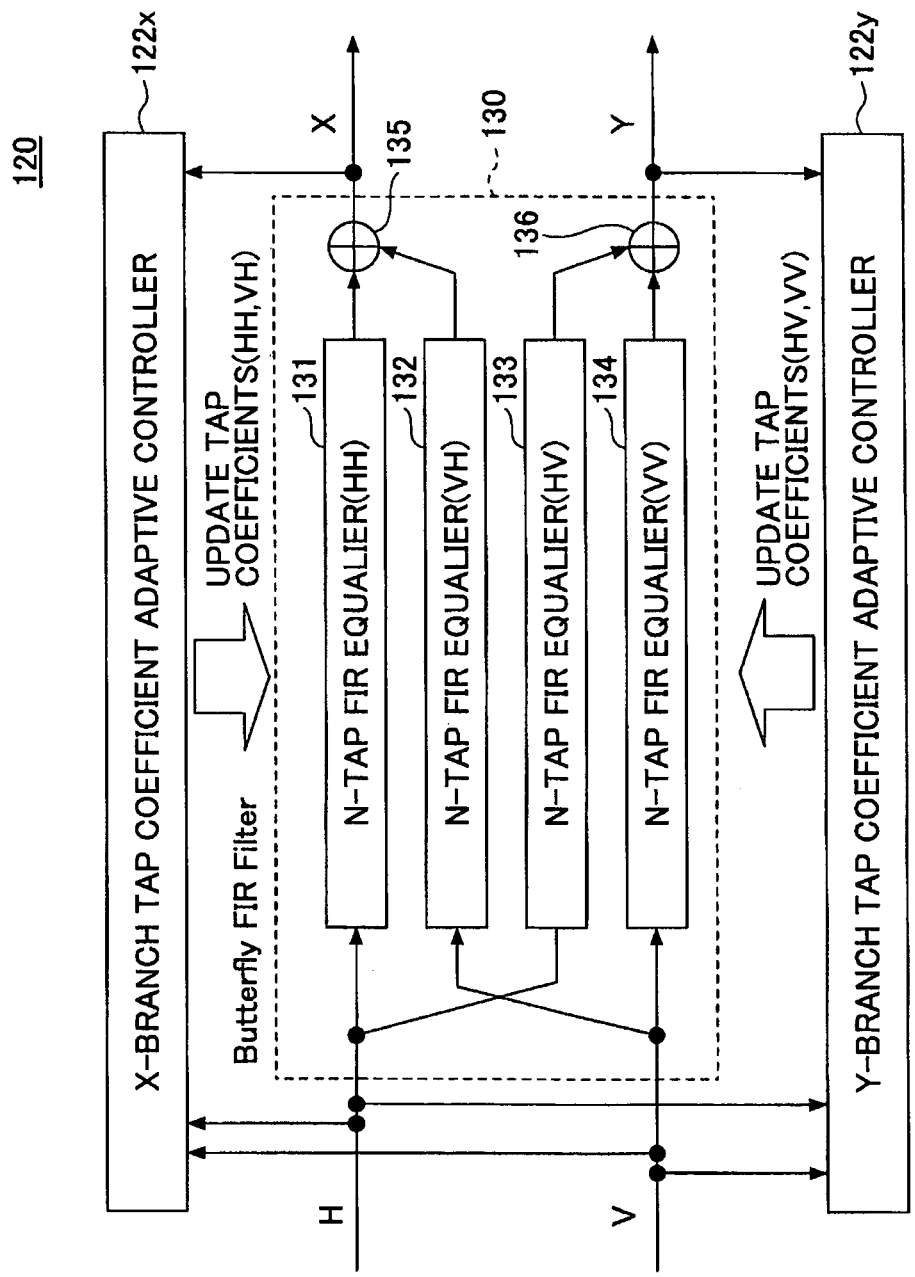
FIG. 3 illustrates an example of structure of an adaptive equalizer according to an embodiment.

FIG. 2 illustrates an example of a digital coherent optical receiver 100 (hereinafter, referred to simply as "optical receiver 100") according to an embodiment, and FIG. 3 schematically illustrates the structure of an adaptive equalizer 120. An optical signal having propagated through an optical fiber is received at the optical receiver 100. The optical signal is separated by a polarization beam splitter 101 into a polarization component along the horizontal axis (referred to as "a H-axis polarization component") and a polarization component along the vertical axis (referred to as "a V-axis polarization component"). The H-axis polarization component and the V-axis polarization components are supplied to the associated 90-degree optical hybrid mixers 102 and 103, respectively. An output of the local oscillator laser 104 is also split into two light components by a polarization beam splitter 105 and input to the associated 90-degree optical hybrid mixers 102 and 103, respectively.

In the 90-degree optical hybrid mixer 102, the H-axis polarization component and the local oscillation light component are mixed and separated into an in-phase channel (I-channel) component and a quadrature channel (Q-channel) component. The in-phase component and the quadrature component are output to the twin photodiodes 107a and 107b, respectively, converted to electric signals, and further converted to digital signals by A/D converters 108a and 108b, respectively. Similarly, in the 90-degree optical hybrid mixer 103, the V-axis polarization component and the local oscillation light component are mixed and separated into an in-phase channel (I-channel) component and a quadrature channel (Q-channel) component. The in-phase component and the quadrature component are output to the twin photodiodes 107c and 107d, respectively, and converted into electric signals, which electric signals are converted to digital signals by A/D converters 108c and 108d, respectively. The digitalized H-axis signal components and V-axis signal components are input to the digital signal processor 110. The part performing the processes immediately before the A/D converters 108 is called "a polarized wave separator" for convenience sake.

The A/D converted digital sample data are twice oversampling data in this example; however, the oversampling rate is not limited to this example.

In the digital signal processor 110, a waveform distortion compensator 111 reduces distortion in the input digital signals. A phase adjustor 112 adjusts the phase of the distortion-compensated signals. The phase-adjusted signals are input to an adaptive equalizer 120. The outputs from the waveform distortion compensator 111 and the phase adjustor 112 are an H-axis polarization component (the first reception polarization component) polarized along the H axis and containing the in-phase and quadrature components, and a V-axis polarization component (the second reception polarization component) polarized along the V-axis and containing the in-phase and quadrature components.

The adaptive equalizer 120 extracts a X-axis transmission component (the first transmission polarization component) and a Y-axis transmission component (the second transmission polarization component) from the H-axis polarization component and the V-axis polarization component. In this process, the adaptive equalizer 120 adaptively equalizes the residue of equalization carried out by the waveform distortion compensator 111 (including residual wavelength dispersion and polarization mode dispersion), as well as waveform distortion due to the band limitation of wavelength division multiplexing. The X transmission component and the Y transmission component are supplied to a demodulator/data regenerator 121 which demodulates the received signal and regenerates transmitted data.

FIG. 3 illustrates a structure of the adaptive equalizer 120. The adaptive equalizer 120 includes a finite impulse response (FIR) filter 130, a first (X-branch) tap coefficient adaptive controller 122x and a second (Y-branch) tap coefficient adaptive controller 122y. The X-branch tap coefficient adaptive controller 122x controls the FIR tap coefficients for the X-axis polarization component in an adaptive manner. The Y-branch tap coefficient adaptive controller 122y controls the FIR tap coefficients for the Y-axis polarization component in an adaptive manner. Although in the figure only a single FIR filter 130 is depicted for sake of simplicity, M FIR filters 130 are provided to perform M-parallel processing. The FIR filter 130 is called a butterfly filter that performs a butterfly calculation (cross-multiplication) on the H-axis component and the V-axis component during the FIR calculation.

The FIR filter 130 includes an X-branch N-tap FIR equalizer (HH) 131, an X-branch N-tap FIR equalizer (VH) 132, a Y-branch N-tap FIR equalizer (HV) 133, and a Y-branch N-tap FIR equalizer (VV) 134. The H-axis polarization component (containing the in-phase and quadrature components) supplied from the phase adjuster 112 (see FIG. 2) is input to the X-branch N-tap FIR equalizer 131 and the Y-branch N-tap FIR equalizer 133, as well as to the X-branch tap coefficient adaptive controller 122x and the Y-branch tap coefficient adaptive controller 122y. The X-branch N-tap FIR equalizer (HH) 131 extracts the X-axis polarization-multiplexed component from the H-axis polarization component. The Y-branch N-tap FIR equalizer (HV) 133 extracts the Y-axis polarization-multiplexed component from the H-axis polarization component.

Similarly, the V-axis polarization component (containing the in-phase and quadrature components) supplied from the phase adjuster 112 is input to the X-branch N-tap FIR equalizer 132 and the Y-branch N-tap FIR equalizer 134, as well as to the X-branch tap coefficient adaptive controller 122x and the Y-branch tap coefficient adaptive controller 122y. The X-branch N-tap FIR equalizer (VH) 132 extracts the X-axis polarization-multiplexed component from the V-axis polarization component. The Y-branch N-tap FIR equalizer (VV) 134 extracts the Y-axis polarization-multiplexed component from the V-axis polarization component.

The output from the X-branch N-tap FIR equalizer (HH) 131 and the output from the X-branch N-tap FIR equalizer (VH) 132 are connected to the input to the X-branch adder 135. The adder 135 combines the two outputs and supplies an equalized X-branch polarization signal to the demodulator/data regenerator 121 and the X-branch tap coefficient adaptive controller 122x. The output from the Y-branch N-tap FIR equalizer (HV) 133 and the output from the Y-branch N-tap FIR equalizer (VV) 134 are connected to the input to the Y-branch adder 136. The adder 136 combines the two outputs and supplies an equalized Y-branch polarization signal to the demodulator/data regenerator 121 and the Y-branch tap coefficient adaptive controller 122y.

The X-branch tap coefficient adaptive controller 122x and the Y-branch tap coefficient adaptive controller 122y update the X-branch FIR tap coefficients and the Y-branch FIR tap coefficients, respectively, in an adaptive manner using an arbitrary algorithm. For example, a constant modulus algorithm (CMA) and a decision-directed least mean squares algorithm (DD-LMS) are known.

In one embodiment, in the initial training period, tap coefficient adaptive controllers 122x and 122y carry out adaptive control on the tap coefficients such that the tap coefficients converge with good symmetry (as illustrated in FIG. 1A) in the X-branch and the Y-branch, respectively, by appropriately correcting the tap coefficients.

In another embodiment, during communications (after the initial training period), the tap coefficient adaptive controllers 122x and 122y carry out adaptive control on the tap coefficients such that the tap coefficients converge with good symmetry during communications, while maintaining the continuity of demodulated data even if the tap coefficients are shifted for the correction of the tap coefficients.

Detailed structure and operations during the initial training period and data transmission (communications) are described below.

Embodiment 1

Control during Initial Training Period

Figure 4:
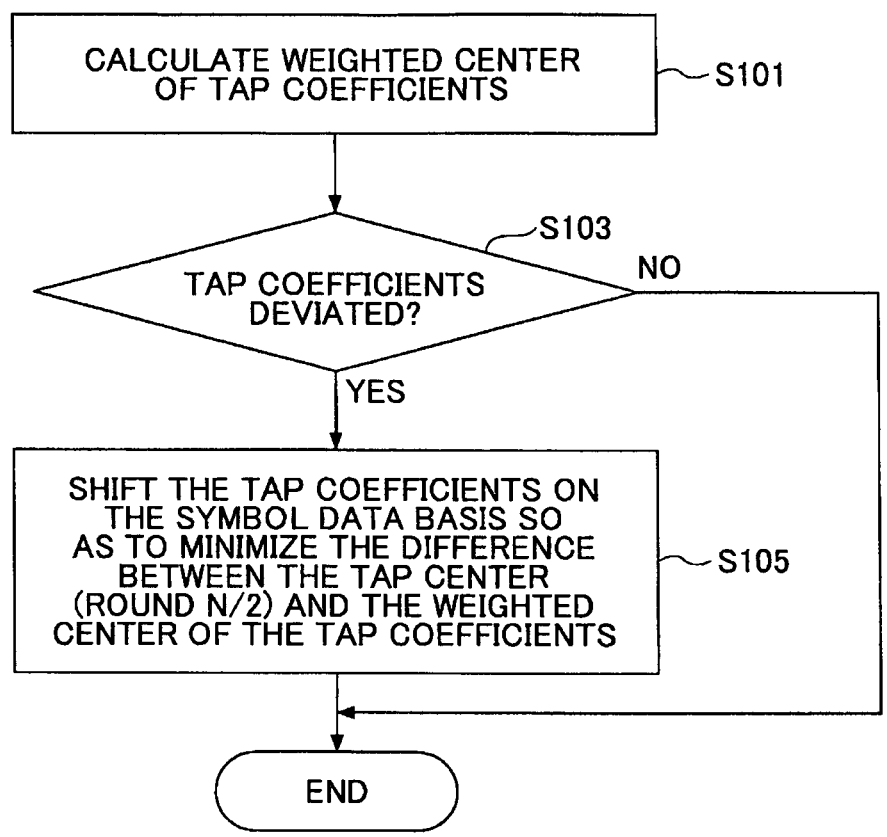
FIG. 4 illustrates a tap coefficient correcting method for an adaptive equalizer performed in the initial training period according to Embodiment 1.
Figure 5:
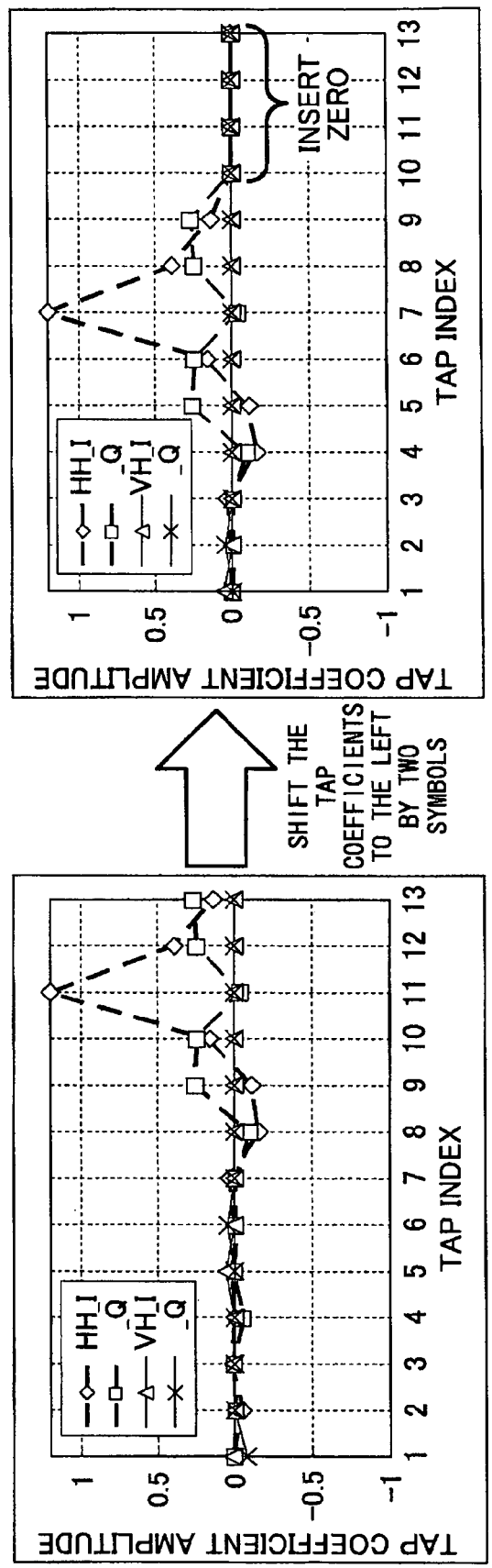
FIG. 5 illustrates an example of correction of tap coefficients performed in the initial training period according to Embodiment 1.

FIG. 4 is a flowchart illustrating a tap coefficient correcting method performed in the initial training period according to Embodiment 1. FIG. 5 is a diagram illustrating how the tap coefficients are corrected. A tap coefficient adaptive controller 122 of an adaptive equalizer 20 calculates a weighted center of the tap coefficients of an N-tap filter periodically or in a prescribed state to determine whether the convergence of the initial tap coefficients has deviated from a proper position.

In step S101 of the flowchart of FIG. 4, the weighted center of the tap coefficients of the FIR filter 130 is calculated. The "weighted center of tap coefficients" or the "weighted center of coefficients" indicates a position of the weighted center, of the filtering shape determined by the tap coefficients. The weighted center of the tap coefficients is determined by, for example, calculating a weighted center of electric power levels or the position of the maximum amplitude of the tap coefficients. In the initial training period before actual communications, the convergence of the tap coefficients of the FIR filter may not be appropriately positioned at the tap center, as illustrated in FIG. 1B. The "tap center" or the "center of the taps" indicates a center position of the taps determined by the number of taps. If the number of taps is N, the tap center is determined by round (N/2). For example, if the number of taps is thirteen as illustrated in FIG. 1A and FIG. 1B, the tap center is the seventh tap (round (13/2)=7).

The X-branch tap coefficient adaptive controller 122x calculates a weighted center of the X-branch tap coefficients. The Y-branch tap coefficient adaptive controller 122y calculates a weighted center of the Y-branch tap coefficients. The weighted center of the tap coefficients may be determined by, for example, (i) calculating a set of weighted centers $g_{ZZ}$ (ZZ=HH, VH, HV, VV) of electric power levels of the tap coefficients for the respective N-tap equalizers 131-134 of the butterfly FIR filter 130, or (ii) calculating weighted centers $g_X$ and $g_Y$ of electric power levels of the tap coefficients for the respective polarization axes.

Using calculation method (i), a weighted center of the tap coefficients is calculated for each of the N-tap FIR equalizers (filters) 131-134 based upon the following equations.

$$g_{HH} = \sum_{i=1}^{N} i \times |C_{HH}(i)|^2 / P_{HH}$$

$$g_{VH} = \sum_{i=1}^{N} i \times |C_{VH}(i)|^2 / P_{VH}$$

$$g_{HV} = \sum_{i=1}^{N} i \times |C_{HV}(i)|^2 / P_{HV}$$

$$g_{VV} = \sum_{i=1}^{N} i \times |C_{VV}(i)|^2 / P_{VV}$$

Where $C_{ZZ}$ denotes the tap coefficients sequence, "i" denotes the $i^{th}$ tap coefficient of the N-tap filter, and $P_{ZZ}$ denotes the total power level of all the tap indexes and expressed by equation below.

$$P_{ZZ} = \sum_{k=1}^{N} |C_{ZZ}(k)|^2$$

$$ZZ = HH, VH, HV, VV$$

Which one of $g_{HH}$ and $g_{VH}$ is to be selected as the X-branch weighted center depends on which one of $P_{HH}$ and $P_{VH}$ has a greater value. Similarly, which one of $g_{HV}$ and $g_{VV}$ is to be selected as the Y-branch weighted center depends on which one of $P_{HV}$ and $P_{VV}$ has a greater value. With a lower power level, determination of the weighted center becomes inaccurate.

Using calculation method (ii), weighted centers gX and gY of the tap coefficients are calculated for the respective polarization axes according to the following equations.

$$g_X = \sum_{i=1}^{N} i \times (|C_{HH}(i)|^2 + |C_{VH}(i)|^2) / P_X$$

where $$P_X = \sum_{k=1}^{N} (|C_{HH}(k)|^2 + |C_{VH}(k)|^2)$$

$$g_Y = \sum_{i=1}^{N} i \times (|C_{HV}(i)|^2 + |C_{VV}(i)|^2) / P_Y$$

where $$P_Y = \sum_{k=1}^{N} (|C_{HV}(k)|^2 + |C_{VV}(k)|^2)$$

Using method (ii), an appropriate weighted center can be determined even if the electric power disperses across $g_{HH}$ and $g_{VH}$, or across $g_{HV}$ and $g_{VV}$.

Either method (i) or method (ii) may be employed to calculate the weighted center. However, for monitoring the weighted center of the tap coefficients during communications, which will be described below in conjunction with Embodiment 2, method (ii) is preferable from the viewpoint of adaptively controlling the entirety of positions of the tap coefficients such that the weighted center of the tap coefficients is always positioned close to the tap center.

Next, in step S103, it is determined based upon the calculated weighted center if the tap coefficients have deviated. If the X-branch weighted center of the tap coefficients calculated from method (i) (or the peak amplitude of the tap coefficients) is positioned near tap index 11 as illustrated in FIG. 5 and the convergence of the tap coefficients has deviated from the tap center (YES in S103), the process proceeds to step S105. In step S105, all of the tap coefficients are shifted to the left by two symbols so as to minimize the difference between the weighted center of the tap coefficients and the tap center (tap index 7 in the example illustrated in FIG. 5). The tap center of the N-tap filter may be determined from round (N/2) as has been described above. When the number of taps is thirteen, round (13/2) equals 7 and therefore, the tap index 7 becomes the tap center.

Shifting of the tap coefficients is carried out on the symbol-data basis, which is called symbol-based shifting. The "symbol-based shifting" or the "shifting on the symbol-data basis" means that the minimum shifting size of the tap coefficients is one symbol. The tap coefficients are shifted as a whole, for example, by +1 (1 symbol to the right) or −2 (2 symbols to the left). By adapting the symbol-based shifting, the tap coefficients can be shifted on the symbol data basis regardless of whether the input data supplied to the adaptive equalizer are oversampled, or regardless of the oversampling rate if oversampled. As long as the tap coefficients converge and the filtering function is achieved, the equalization state itself is not much affected even if the input signals to the filter are shifted one symbol or two symbols. In this case, the output of the equalizer (filter) shifts one symbol or two symbols, while the equalization state is maintained.

If the difference between the weighted center of the tap coefficients and the tap center is less than one symbol, it is unnecessary to shift the set of tap coefficients (NO in S103), and the process terminates. A threshold value may be used in the determination step S103. In this case, the set of tap coefficients is not shifted unless the difference between the weighted center of the tap coefficients and the tap center exceeds the threshold value.

Figure 6:
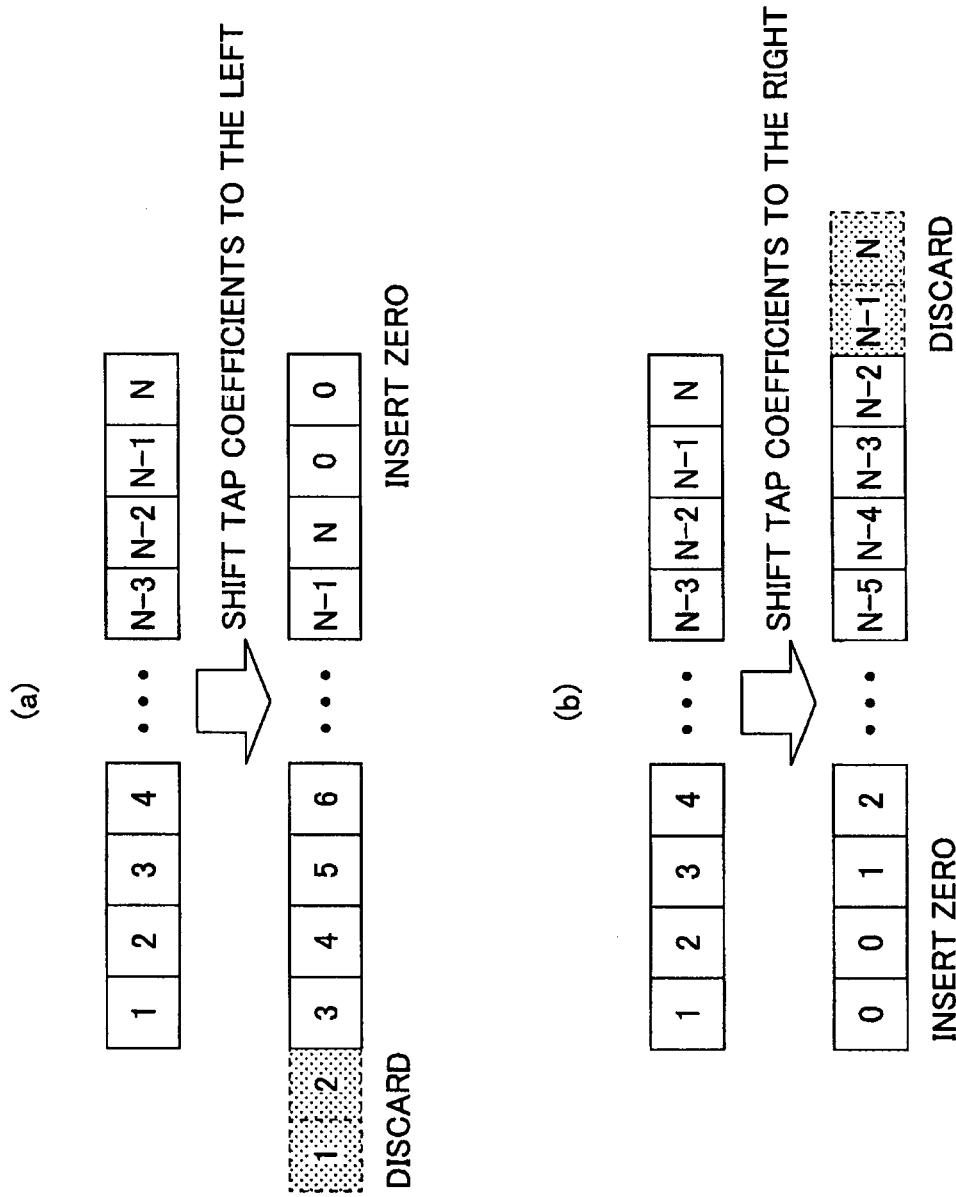
FIG. 6 illustrates examples of shifting tap coefficients.

FIG. 6 illustrates an example of shifting N tap coefficients. The tap coefficients are shifted as a whole on the symbol data basis, as described above. In this example, the input data to the adaptive equalizer 120 is twice oversampled, and therefore, the minimum shifting size (i.e., 1 symbol) of the tap coefficients corresponds to two samples. In example (a) of FIG. 6, the weighted center of the tap coefficients is positioned at a greater tap index, and the entirety of the tap coefficients allocated to 1, 2, . . . , N−1 and N are shifted to the left by one symbol (i.e., two sample data items). If the tap coefficients are shifted to the left by one symbol, the tap coefficients that have been set for tap indexes 1 and 2 overflow. The overflowed tap coefficients are discarded, and instead, zero (0) is inserted in taps indexed N−1 and N on the other side.

In example (b) of FIG. 6, the weighted center of the tap coefficients is positioned at a smaller tap index, and the entirety of the tap coefficients are shifted to the right by one symbol. The overflowed tap coefficients that have been set for tap indexes N−1 and N are discarded, and instead, zero (0) is inserted in taps indexed 1 and 2 on the other side.

If a butterfly FIR filter 130 is used in the adaptive equalizer 120 as illustrated in FIG. 3, twice oversample data items are input and subjected to equalization, and the X-branch equalization result and the Y-branch equalization result may be output at a symbol rate.

Figure 7:
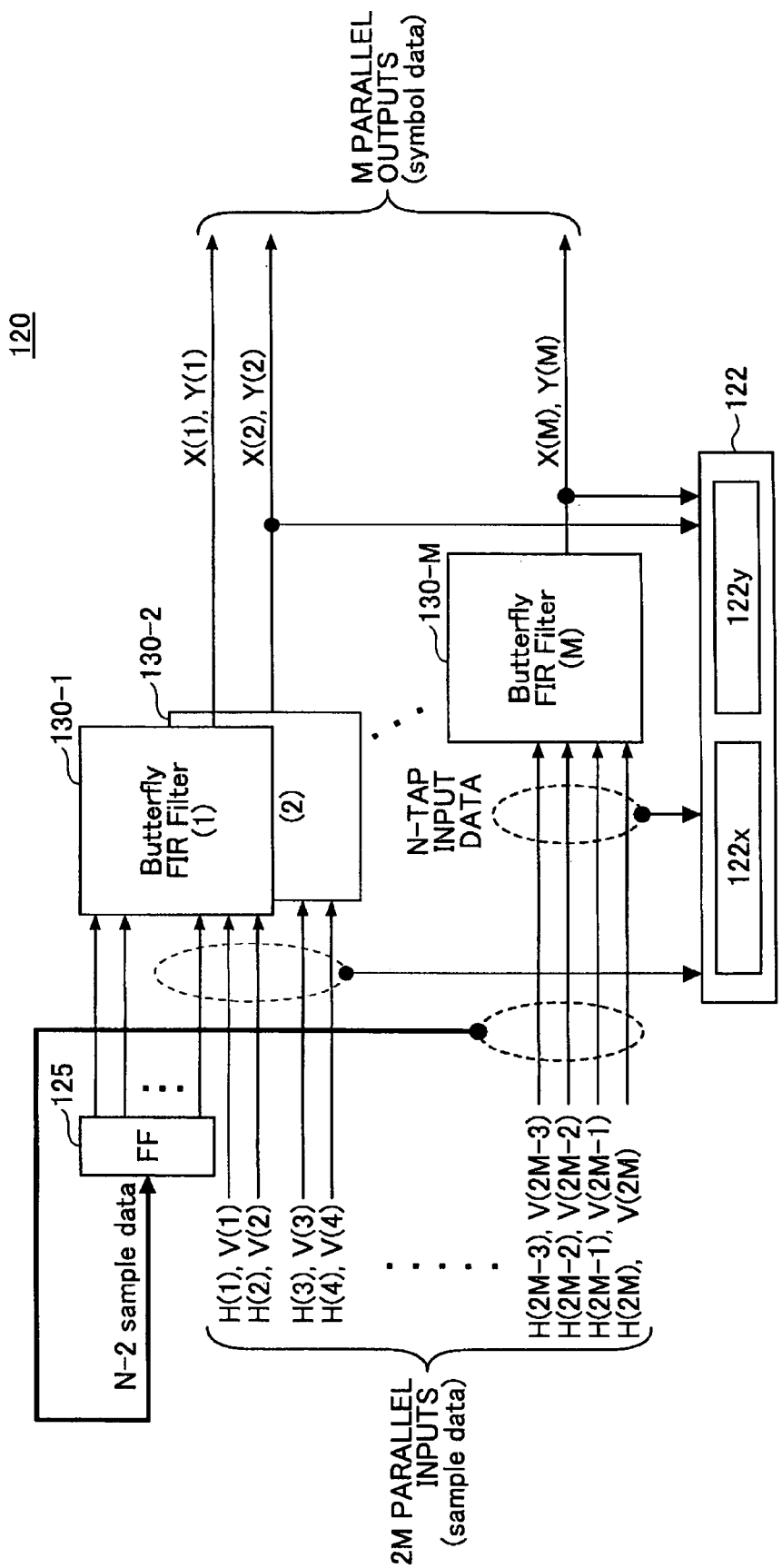
FIG. 7 illustrates parallel processing of an adaptive equalizer.

FIG. 7 illustrates a schematic diagram of the adaptive equalizer 120 using M-parallel butterfly FIR filters 130-1 through 130-M. Here, 2×M sample data items are input in parallel for each of the H-axis polarization component and the V-axis polarization component, and data items corresponding to N taps are supplied to each of the butterfly FIR filters 130-$i$ through 130-M. Each of the butterfly FIR filters 130-1 through 130-M performs equalization and outputs a X-branch equalization result and a Y-branch equalization result.

Accordingly, M parallel symbol data items are acquired for the X-branch polarization component and the Y-branch polarization component. The last (N−2) sample data items of the 2×M sample data items are one-clock delayed at a flip-flop (FF) circuit 125 and input to FIR filters 130-1 through 130-J (J=[round(N/2)]−1).

In this manner, in the initial training period, the tap coefficients are corrected by shifting the tap coefficients as a whole on the symbol data basis so as to minimize the difference between the weighted center of the tap coefficients and the tap center. Consequently, the state A illustrated in FIG. 1A, without deviation of convergence of the tap coefficients, can be achieved.

This arrangement is advantageous because the initial training of the tap coefficients can be efficiently carried out in a simple process, without significantly changing the hardware structure.

Embodiment 2

Control During Communications

Figure 8:
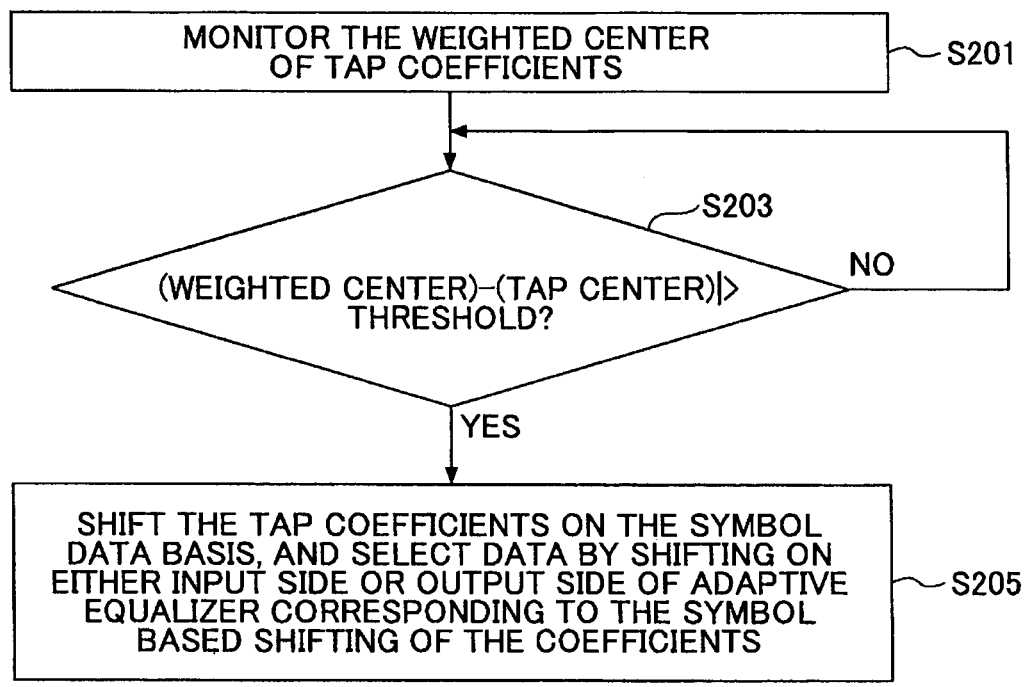
FIG. 8 illustrates a tap coefficient correcting method for an adaptive equalizer performed during communications according to Embodiment 2.

FIG. 8, FIG. 9 and FIG. 10 are diagrams for explaining a tap coefficients correcting method performed during data transmission (communications). In the flowchart of FIG. 8, in step S201, the weighted center of the tap coefficients is monitored. The weighted center of the tap coefficients can be monitored using either one of method (i) and method (ii), as described above. However, to correctly determine the position of the weighted center even if the power levels disperse between HH component and VH component, or between HV component and VV component, it is preferable to calculate the weighted center of the tap coefficients on the polarization axis basis using method (ii).

Next, in step S203, it is determined if the difference between the weighted center of the tap coefficients and the tap center exceeds the threshold value. If the difference becomes greater than the threshold value (YES in S203), the process proceeds to step S205. In step S205, the tap coefficients are shifted as a whole on the symbol data basis so as to bring the weighted center of the tap coefficients closest to the tap center. Simultaneously, data items are shifted on either side of the input data or the output data of the adaptive equalizer 120, corresponding to the number of symbols shifted for the correction of the tap coefficients, and successive data items are selected to maintain the continuity of the demodulated data during data transmission. The threshold value used in S203 is, for example, one symbol.

FIG. 9 schematically illustrates an example of shifting the data items on the output side of the adaptive equalizer 120 to select a set of successive data items to be output corresponding to the shift of tap coefficients. It is assumed that the adaptive equalizer 120 outputs M parallel data items. If the tap coefficient shifting operation is permitted within a range of ±k symbols (−k to +k), 2×k symbol data lines are provided, in addition to M symbol data lines, for the last 2×k symbols of the previous operation. If tap coefficients are allowed to be shifted up to 3 symbols to the left-hand-side and to the right-hand-side, the value k equals 3 (k=3).

In this example, it is assumed that the initial output lines are lines 0 through k−1 of the 2×k symbol data lines, and M-k lines of the M symbol data lines (k=0). It is also assumed that, during data transmission (communications), the weighted center of the tap coefficients deviates two symbols from the tap center to the right-hand-side due to polarization mode dispersion or vibrations. Since the weighted center of the tap coefficients has fluctuated exceeding the threshold value (YES in S203), correction is made to the tap coefficients by shifting the entirety of the tap coefficients by 2 symbols to the left (S205). Even if the tap coefficients are shifted during data transmission, equalized data items have to be continuously output. Accordingly, the range of data items to be output is shifted corresponding to the two-symbol shifting of the tap coefficients. In this example, M successive symbols data items are selected starting from the symbol data line 2 symbols shifting to the left from the initial output position. As a result, continuity of demodulated data can be maintained, while compensating for the shift of the tap coefficients.

FIG. 10 schematically illustrates an example of shifting the data items on the input side of the adaptive equalizer 120. A set of successive sample data items to be input to the adaptive equalizer 120 are selected corresponding to the shifting state of tap coefficients. Under the condition that the tap coefficients are shifted within the range of ±k symbols, 4k+N−2 sample data lines are provided in addition to 2×M sample data lines on the input side of the adaptive equalizer 120. If the coefficient shifting up to 3 symbols is permissible on the left side and the right side, respectively, k equals 3 (k=3).

It is assumed that the initial input lines to a FIR filter 130 are lines 0 through 2k+N−3 of the 4k+N−2 sample data lines, and 2M−2k lines of the 2×M sample data lines. It is also assumed that, during data transmission (communications), the weighted center of the tap coefficients shifts two symbols from the tap center to the right-hand-side due to polarization mode dispersion or vibrations. Since the weighted center of the tap coefficients has fluctuated exceeding the threshold value (YES in S203), correction is made to the tap coefficients by shifting the entirety of the tap coefficients by 2 symbols to the left (S205). Even if the tap coefficients are shifted during data transmission, equalized data items have to be continuously output. In this example, to shift the range of data items to be input in accordance with the two-symbol shifting of the tap coefficients, successive sample data items are selected starting from four sample data lines shifting to the left from the initial input position. As a result, continuity of demodulated data can be maintained, while compensating for the shift of the tap coefficients.

Examples of the structure for maintaining the continuity of the data items on the output side and the input side are described below in conjunction with FIG. 12 and FIG. 13.

Embodiment 3

Configurations of Tap Coefficient Adaptive Controller and Adaptive Equalizer

Figure 11:
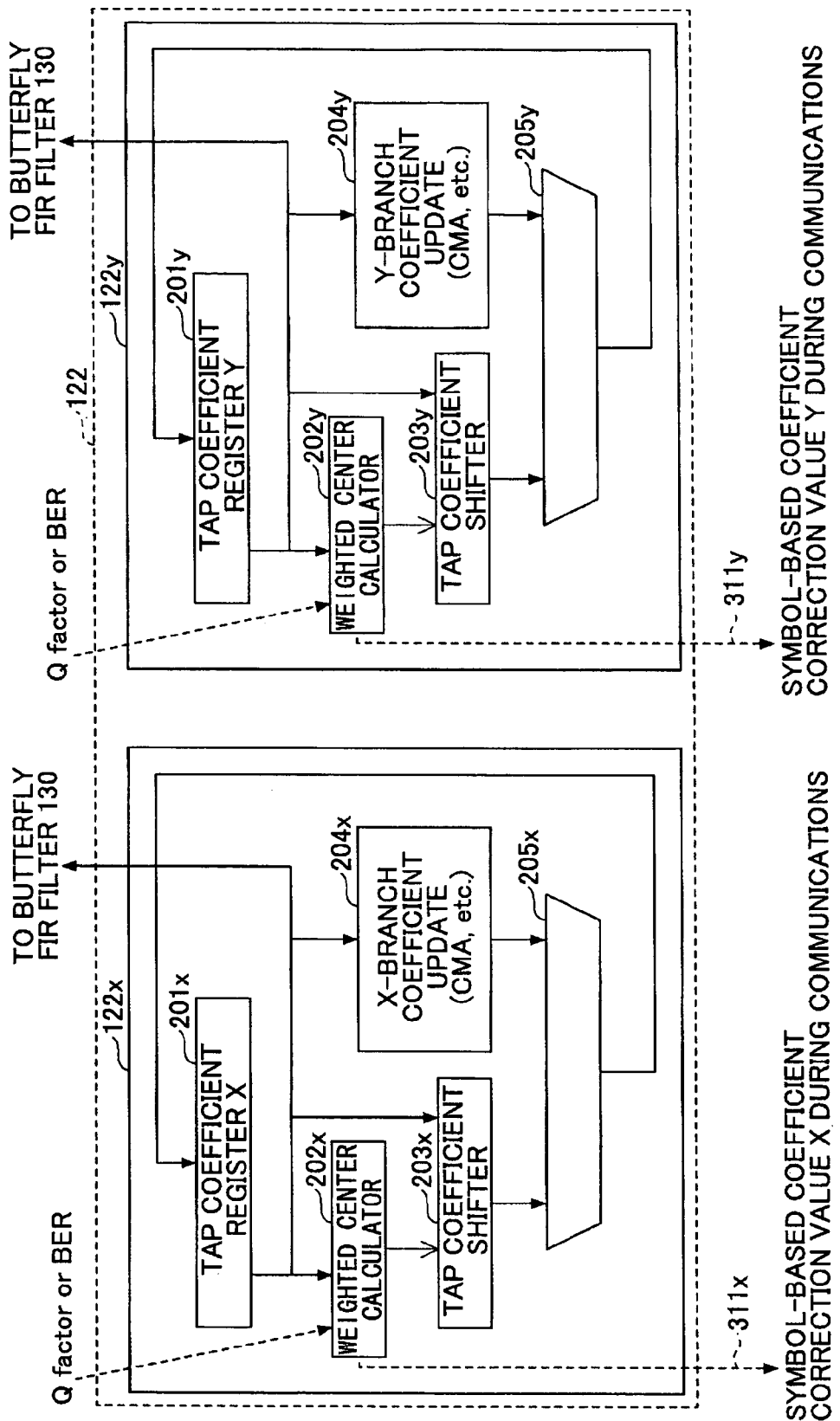
FIG. 11 illustrates an example of a tap coefficient adaptive controller that carries out the tap coefficient correcting method of the embodiments.

FIG. 11 illustrates a configuration of the tap coefficient adaptive controller 122 (see FIG. 3) which carries out the tap coefficient correcting methods of Embodiment 1 and Embodiment 2. The tap coefficient adaptive controller 122 includes an X-branch tap-coefficient adaptive controller 122$x$ and a Y-branch tap-coefficient adaptive controller 122$y$ to handle independently the X-axis polarization component and the Y-axis polarization component. Since the structures of the X-branch tap-coefficient adaptive controller 122$x$ and the Y-branch tap-coefficient adaptive controller 122$y$ are the same, explanation is only made of the X-branch tap-coefficient adaptive controller 122$x$ in the following descriptions.

The X-branch tap-coefficient adaptive controller 122$x$ includes a tap coefficient register 201$x$, a weighted center calculator 202$x$, a tap coefficient shifter 203$x$, an X-branch coefficient updating device 204$x$, and a coefficient selector 205$x$.

Tap coefficient shifting control is performed only when the initial training state is in a prescribed state and when fluctuation of the weighted center of the tap coefficients exceeds a prescribed threshold during data transmission. Accordingly, in the ordinary state other than the above-described cases, the tap coefficient adaptive controller 122$x$ carries out ordinary tap coefficient adaptive control. In the ordinary state, a coefficient updating result calculated by a constant modulus algorithm (CMA), a decision-driven least mean squares (DD-LMS) algorithm, or any other suitable algorithm is output from the X-branch coefficient updating device 204$x$. The updating result is taken in the tap coefficient register 201$x$ via the coefficient selector 205$x$. In this example, the coefficients are updated using CMA.

The equalization formulas used in the butterfly FIR filter 130 are presented below.

$$X_n = C_{HH,n} \cdot H_n + C_{VH,n} \cdot V_n$$

$$Y_n = C_{HV,n} \cdot H_n + C_{VV,n} \cdot V_n$$

where the operation. "·" represents convolution of the received signal sequence (H, V) with the tap coefficient sequence C.

When using the constant modulus based algorithm in the tap coefficient adaptive controller 122, the tap coefficient sequence C is updated based on the received signal sequences H and V, and the equalized outputs X and Y at time "n".

$$C_{HH,n+\tau} = C_{HH,n} - \alpha H^*_n (|X_n|^2 - \gamma) X_n$$

$$C_{VH,n+\tau} = C_{VH,n} - \alpha V^*_n (|X_n|^2 - \gamma) X_n$$

$$C_{HV,n+\tau} = C_{HV,n} - \alpha H^*_n (|Y_n|^2 - \gamma) X_n$$

$$C_{VV,n+\tau} = C_{VV,n} - \alpha V^*_n (|Y_n|^2 - \gamma) V_n$$

Where
α: step size of updating coefficients
γ: target level (constant value) of output power
τ: tap coefficient updating interval (constant value determined by the flow-up speed).

During a time period from n to n+τ−1, the tap coefficient sequence C at time n is maintained. The X-branch tap coefficient adaptive controller 122$x$ carries out the top two operations of the above-presented four operations to update the tap coefficient sequence $C_{HH}$ and $C_{VH}$. The Y-branch tap coefficient adaptive controller 122$y$ carries out the bottom two operations of the above-presented four operations to update the tap coefficient sequence $C_{HV}$ and $C_{VV}$.

The weighted center calculator 202$x$ calculates the weighted center of the tap coefficients set in the tap coefficient register 201$z$ to monitor whether the distance (the difference) between the weighted center of the tap coefficients and the tap center is within the threshold value. If the difference between the weighted center of the tap coefficients and the tap center exceeds the threshold value, the weighted center calculator 202$x$ outputs a shift instruction to the tap coefficient shifter 203$x$ corresponding to the difference. The tap coefficient shifter 203$x$ outputs a shifted set of tap coefficients to the coefficient selector 205$x$ only when shifting the tap coefficients.

The coefficient selector 205$x$ normally selects the output from the X-branch coefficient updating device 204$x$ and supplies the updated set of coefficients to the tap coefficient register 201$x$. Only when the fluctuation of the weighted center of the tap coefficients from the tap center exceeds the threshold value and correction is required (i.e., there is an output from the tap coefficient shifter 203$x$), the coefficient selector 205$x$ selects and outputs the shifted set of tap coefficients to the tap coefficient register 201$x$.

The updated tap coefficient sequences (including the shifted sequences) for HH and VH components registered in the tap coefficient register 201$x$ are supplied to the N-tap FIR equalizer (HH) 131 and the N-tap FIR equalizer (VH) 132 of the butterfly FIR filter 130 (see FIG. 3). Similarly, the updated tap coefficient sequences (including the shifted sequences) for HV and VV components registered in the tap coefficient register 201$x$ are supplied to the N-tap FIR equalizer (HV) 133 and the N-tap FIR equalizer (VV) 134 of the butterfly FIR filter 130.

The weighted center calculator 202$x$ determines the tap coefficient shifting amount in a cumulative manner from the completion of the initial training, and outputs a select signal 311x representing the symbol-based coefficient correction value X during communications. The select signal 311x is supplied to a selector 301 (FIG. 12) or a selector 401 (FIG. 13). Similarly, the weighted center calculator 202y of the tap coefficient adaptive controller 122y determines the tap coefficient shifting amount in a cumulative manner from the completion of the initial training, and outputs a select signal 311y representing the symbol-based coefficient correction value Y during communications. The select signal 311y is supplied to the selector 301 (FIG. 12) or the selector 401 (FIG. 13).

Figure 12:
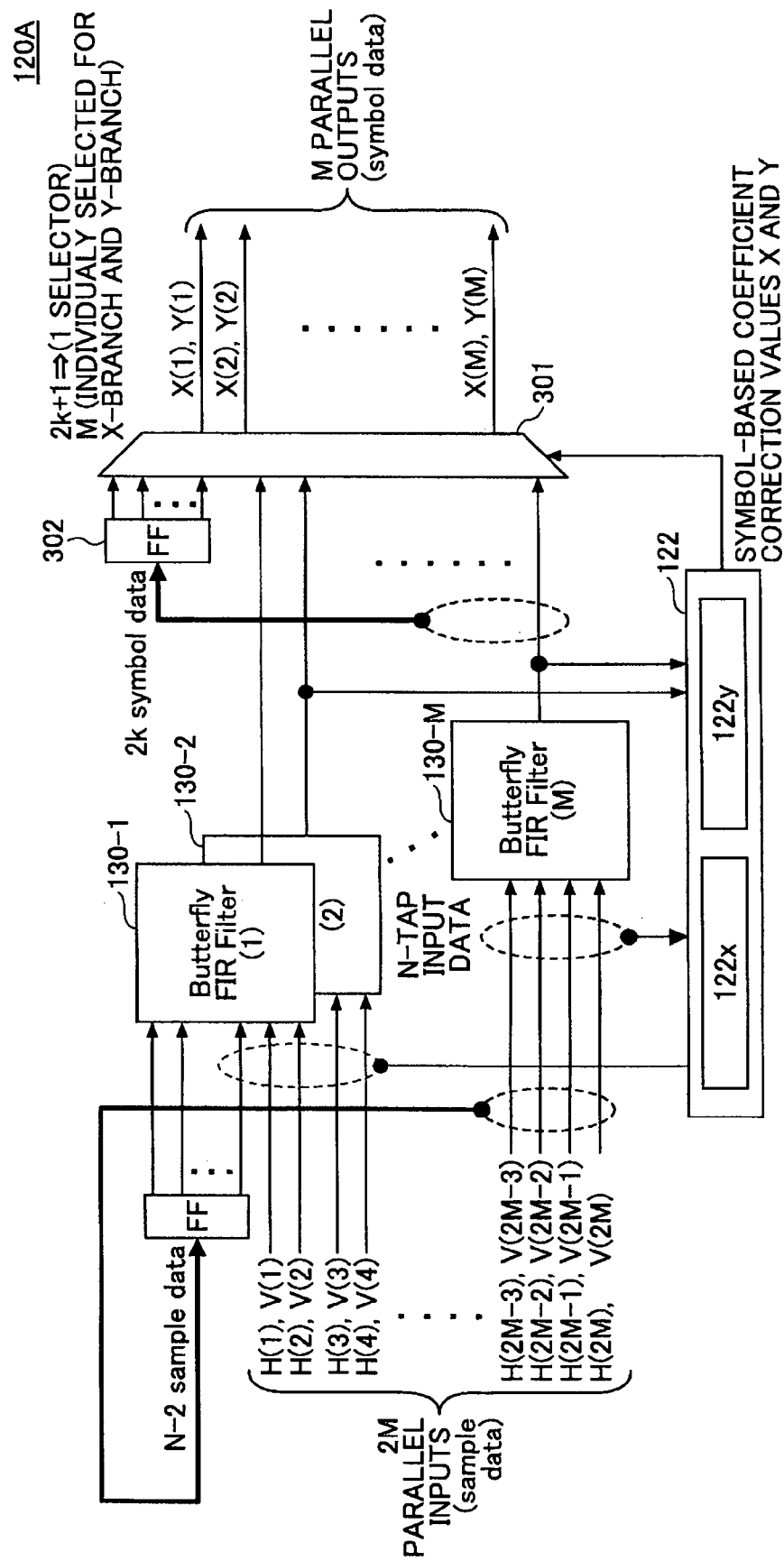
FIG. 12 illustrates shifting of output data from the adaptive equalizer corresponding to shifted symbols in order to maintain continuity of demodulated data when performing tap coefficient correcting control during communications.

FIG. 12 illustrates a structure of an adaptive equalizer 120A which selects data to be output on the output side in accordance with the shifting of the tap coefficients in order to maintain the continuity of demodulated data. This arrangement is in conjunction with step S205 of FIG. 8. The adaptive equalizer 120A has a selector 301 and a flip-flop (FF) circuit 302, in addition to the butterfly FIR filters 130-1 through 130-M and the tap coefficient adaptive controller 122.

If coefficient shifting is permitted up to ±k symbols (k=3, for example), selector 301 receives the last 2×k symbol data items among the M outputs from the butterfly FIR filters 130-1 through 130-M, which have been delayed one clock at the FF 302, in addition to the currently processed M data items output from the butterfly FIR filters 130-1 through 130-M. In other words, the M symbols processed at the current timing are input, together with the last 2×k symbols processed at the previous timing, to the selector 301 such that the output symbol data items continue.

Symbol-based coefficient correction values X and Y are output as select signals 311x and 311y (see FIG. 11) from the X-branch tap coefficient adaptive controller 122x and the Y-branch tap coefficient adaptive controller 122y of the tap coefficient adaptive controller 122 and supplied to the selector 301. The select signals X and Y are, for example, −1 symbol for X-branch and +2 symbols for Y-branch. The select signals X and Y may be set to zero at the end of the initial training, and then a cumulative value of tap coefficient correction determined within the range from −k to +k may be output from the tap coefficient adaptive controller 122. Alternatively, the select signals X and Y may be set to k at the end of the initial training, and a cumulative value corrected within the range from 0 to 2k may be output.

The selector 301 selects M successive symbols among the total of 2k+M symbols according to the shift of the tap coefficients. Consequently, M parallel data items are output from the adaptive equalizer 120A following the data items output immediately before the coefficient correction (shifting).

Figure 13:
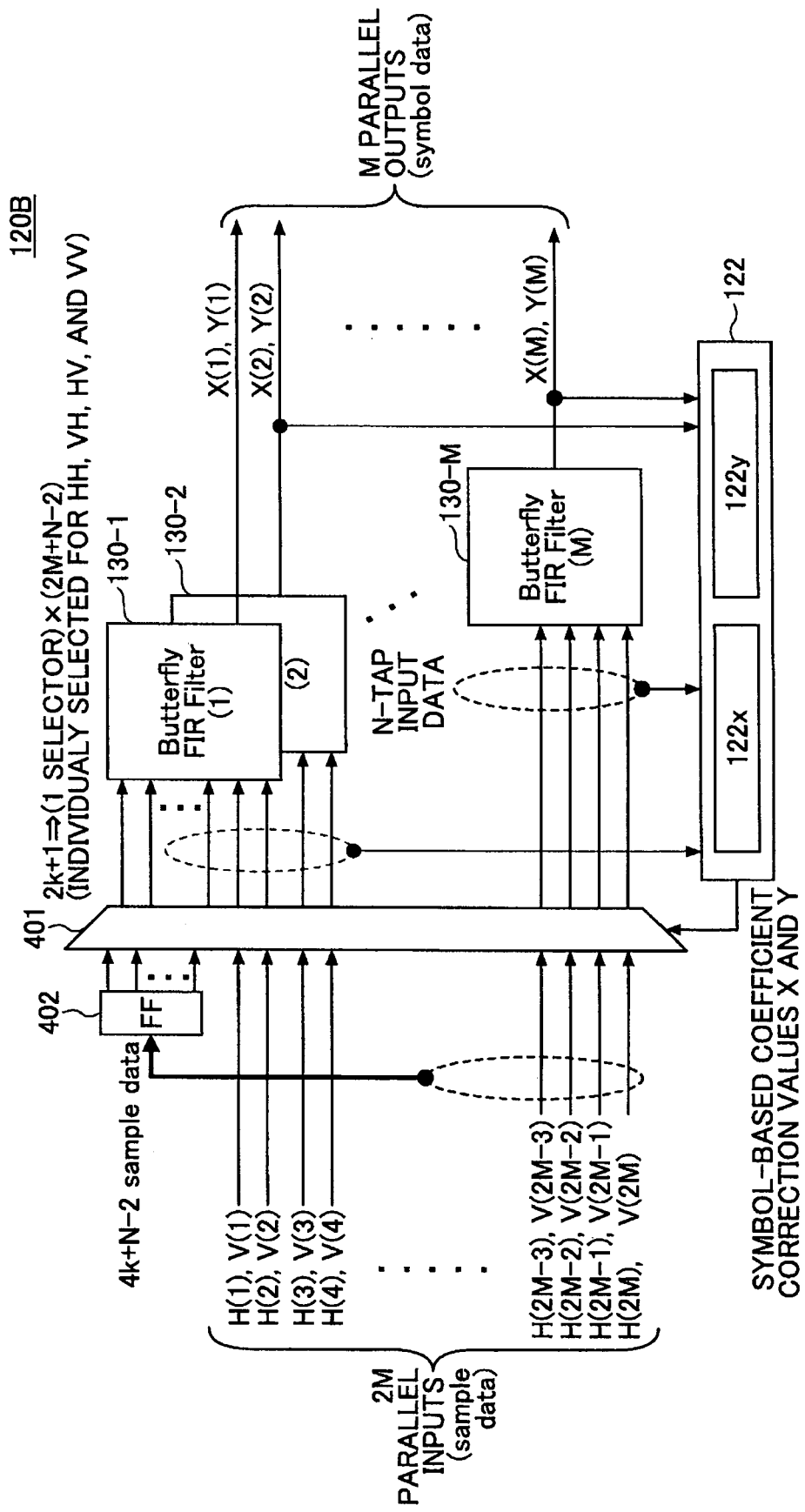
FIG. 13 illustrates shifting of input data to the adaptive equalizer corresponding to shifted symbols in order to maintain continuity of demodulated data when performing tap coefficient correcting control during communications.

FIG. 13 illustrates a structure of an adaptive equalizer 1203 which selects data to be input on the input side in accordance with the shifting of the tap coefficients in order to maintain the continuity of demodulated data. This arrangement is in conjunction with step S205 of FIG. 8. The adaptive equalizer 120B has a selector 401 and a flip-flop (FF) circuit 402, in addition to the butterfly FIR filters 130-1 through 130-M and the tap coefficient adaptive controller 122 (including the X-branch adaptive controller 122x and the Y-branch adaptive controller 122y).

In this example, twice-oversampled data items are input to the adaptive equalizer 120B. It is assumed that coefficient shifting is permitted up to ±k symbols (k=3, for example). The last 4k sample data items (corresponding to 2k symbols) of 2M input sample data items and (N−2) sample data items are delayed one clock by the flip-flop (FF) circuit 402. The selector 401 receives the 2M symbols input at the current timing and the last 4k+N−2 sample data items input at the previous timing.

Symbol-based coefficient correction values X and Y, which correspond to select signals 311x and 311y in FIG. 11, are supplied from the tap coefficient adaptive controller 122 to the selector 401. The selector 401 successively selects 2M+N−2 samples among the total of 4k+2M+N−2 samples every two samples because tap coefficients are corrected (shifted) on the symbol data basis. The symbol-based coefficient correction values X and Y (i.e, the select signal 311x and 311y) are logically the same as those illustrated in FIG. 12. However, the applied timing may differ because timing adjustment may be required such that the selection result of the selector 401 and application timing of the shifted tap coefficients are consistent with each other.

Although not illustrated in the figure, the selector 401 has 4 blocks of HH, VH, HV and VV to select input data for the four N-tap FIR filters of the butterfly FIR filter 130. The HH block and the VH block of the selector 401 are controlled by the symbol-based coefficient correction value X (select signal 311x). The HV block and the VV block of the selector 401 are controlled by the symbol-based coefficient correction value Y (select signal 311y)<

MODIFICATION

The tap coefficient adaptive controller 122 illustrated in FIG. 11 may be modified such that the Q factor (or the BER) and the weighted center of the tap coefficients are monitored during data transmission (communications). In this case, the Q factor (or the BER) is supplied from a Q factor monitoring device (not shown) to the weighted center calculators 202x and 202y. The weighted center calculator 202x and 202y output instructions for symbol-based shifting of the tap coefficients if the degradation of the Q factor exceeds a predetermined threshold value, and if the difference between the weighted center of the tap coefficients and the tap center exceeds a prescribed threshold. The data selection range of the output data of the adaptive controller 120A is shifted in accordance with the shifting of the tap coefficients, as illustrated in FIG. 12, to maintain the continuity of the demodulated data. Alternatively, the data selection range of the sample data to be input to the adaptive controller 120B may be shifted in accordance with the symbol-based shifting of the tap coefficients, as illustrated in FIG. 13, to maintain the continuity of the demodulated data.

FIG. 14 is a flowchart illustrating the tap coefficient correcting method of the modification performed during communications. In step S301, the tap coefficient adaptive controllers 122x and 122y monitor the weighted centers of the tap coefficients and the Q factors (or BER) for the X-branch operation and the Y-branch operation, respectively. In step S303, it is determined if the difference between the weighted center of the tap coefficients and the tap center exceeds a threshold value (Th1), and if degradation of the Q factor (or the BER) exceeds a threshold value (Th2). If they both exceed the threshold values (YES in S303), the process proceed to step S305. In step S305, the tap coefficients are shifted as a whole on the symbol data basis to compensate for the fluctuation indicated in the monitoring result, and simultaneously, the data selection range is shifted on either the input side or the output side of the adaptive equalizer 120 corresponding to the symbol-based shifting of the tap coefficients to maintain the continuity of the demodulated data.

With the above-described arrangements, fluctuation of the convergence of the tap coefficients caused by reception noise, polarization mode dispersion, or fluctuation in rotation of the polarization plane can be corrected, while maintaining the implementable number of taps N. Consequently, appropriate control results of adaptive equalization can be acquired.

In the embodiments, deviation of the tap coefficients from the correct converging position is monitored based on the weighted center of the tap coefficients. However, the convergence deviation may be detected based on the pick position (the maxim-amplitude position) of the tap coefficients. In the modification, the Q factor or the bit error rate is monitored to detect fluctuation in the optical signal quality. However, an arbitrary factor of the optical signal quality may be monitored. In this case, if the optical signal quality is degraded over a predetermined threshold, and if the difference between the converging position of tap coefficients and the tap center exceeds a prescribed threshold, then correction control is performed to shift the tap coefficients.

The tap coefficient adaptive controller 122 illustrated in FIG. 11 may be modified such that during the initial period priority is placed on execution of a coefficient updating algorithm. In this case, the tap coefficient shifting operation based upon the output of the weighted center calculator 202 is performed once or several times at fixed timing during the initial training period. Alternatively, once the tap coefficients have converged in the initial training period, the shifting of the tap coefficients may be performed only when the difference between the weighted center of the tap coefficients and the tap center exceeds a predetermined value. The oversampling rate is not limited to twice, and the embodiments are applicable to n-times oversampling rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An adaptive equalizer comprising:
a finite impulse response filter with a predetermined number of taps; and
a tap coefficient adaptive controller having a register to hold tap coefficients for the filter, a weighted center calculator to calculate a weighted center of the tap coefficients, and a tap coefficient shifter to shift the tap coefficients based on a calculation result of the weighted center,
the tap coefficient shifter being configured, during an initial training period, to shift the tap coefficients on a symbol data basis so as to minimize a difference between the calculated weighted center of the tap coefficients and a tap center defined by the number of taps.

2. An optical receiver, comprising:
a polarization separator configured to separate a received optical signal into a first reception polarization component and a second reception polarization component;
an analog-to-digital converter configured to convert the first reception polarization component and the second reception polarization component into digital signals; and
an adaptive equalizer as recited in claim 1 configured to equalize the digital signals.

3. An adaptive equalizer comprising:
a finite impulse response filter with a predetermined number of taps; and
a tap coefficient adaptive controller having a register to hold tap coefficients for the filter, a weighted center calculator to calculate a weighted center of the tap coefficients, and a tap coefficient shifter to shift the tap coefficients based on a calculation result of the weighted center,
the tap coefficient shifter being configured, if a difference between the calculated weighted center of the tap coefficients and a tap center determined by the number of taps exceeds a predetermined threshold value during communications after the initial training period, to shift the tap coefficients on a symbol data basis so as to bring the weighted center of the tap coefficients closer to the tap center.

4. The adaptive equalizer of claim 3, wherein the tap coefficient adaptive controller further includes:
a tap coefficient updating device configured to update values of the tap coefficients; and
a coefficient selector configured, if the tap coefficients held in the register are shifted on the symbol data basis, to output the shifted tap coefficients, and otherwise, to output the updated values of the tap coefficients determined by the tap coefficient updating device.

5. The adaptive equalizer of claim 3, further comprising:
M of the finite impulse response filters arranged in parallel;
a logic circuit configured, if symbol-based coefficient shifting is permitted in a range from −k to +k (k is a natural number) by the tap coefficient shifter, to delay a last 2k of symbol data items among M of the symbol data items output from the M parallel finite impulse response filters by one clock; and
a data selector provided on an output side of the M filters and configured to select M successive symbol data items from a total of the 2k delayed symbol data items and the M parallel symbol data items currently output from the M parallel filters according to the shifting state of the tap coefficients.

6. The adaptive equalizer of claim 3, further comprising:
M of the finite impulse response filters arranged in parallel, each of the filters having N taps (N is a natural number);
a logic circuit configured, if the symbol-based coefficient shifting is permitted in a range from −k to +k (k is a natural number) by the tap coefficient shifter, and if n-times oversampled data items are input to the M filters (n is a natural number), to delay a last n×2k sample data items and N−n sample data items of n×M sample data items by one clock; and
a data selector provided on an input side of the M filters and configured to select (n×M+N−n) successive sample data items from a total of the (n×2k+N−n) delayed sample data items and n×M sample data items currently input to the M parallel filters according to the shifting state of the tap coefficients.

7. The adaptive equalizer of claim 3, wherein the tap coefficient shifter is configured to discard a tap coefficient having overflowed on one side of the register due to the symbol-based shifting of the tap coefficients and insert zero on another side of the register.

8. The adaptive equalizer of claim 3, wherein the finite impulse response filter is configured to extract a first transmission polarization component and a second transmission polarization component from an inputted first reception polarization component and an inputted second reception polarization component, and wherein the tap coefficient adaptive controller includes a first tap coefficient adaptive controller configured to control an equalization process for the first transmission polarization component and a second tap coefficient adaptive controller configured to control an equalization process for the second transmission polarization component.

9. The adaptive equalizer of claim 3, wherein the finite impulse response filter has N-tap filtering devices configured to extract a first transmission polarization component and a second transmission polarization component from an inputted first reception polarization component and second reception polarization component, and
wherein the weighted center calculator is configured to calculate the weighted center of the tap coefficients for each of the N-tap filtering devices.

10. The adaptive equalizer of claim 3,
wherein the finite impulse filter is configured to extract a first transmission polarization component and a second transmission polarization component from an inputted first reception polarization component and an inputted second reception polarization component, and
wherein the weighted center calculator calculates the weighted center for each of the first transmission polarization component and the second transmission polarization component.

11. The adaptive equalizer of claim 3, wherein the finite impulse response filter includes:
a first N-tap filtering device configured to extract the first transmission polarization component from a first reception polarization component;
a second N-tap filtering device configured to extract the first transmission polarization component from a second reception polarization component;
a first adder configured to add the first transmission polarization components extracted by the first and second N-tap filtering devices;
a third N-tap filtering device configured to extract a second transmission polarization component from the first reception polarization component;
a fourth N-tap filtering device configured to extract the second transmission polarization component from the second reception polarization component; and
a second adder configured to add the second transmission polarization components extracted by the third and fourth N-tap filtering devices.

12. A tap coefficient correcting method performed in an adaptive equalizer of a digital coherent optical receiver, comprising:
monitoring a weighted center of tap coefficients of a filter having a prescribed number of taps;
determining a difference between the weighted center of the tap coefficients and a tap center determined by the number of taps;
determining if the difference exceeds a predetermined threshold value;
if the difference exceeds the threshold value, shifting the tap coefficients on a symbol data basis so as to bring the weighted center closer to the tap center; and
selecting a prescribed number of successive data items on either an input side or an output side of the adaptive equalizer, compensating for data items corresponding to the symbol-based shifting of the tap coefficients.

13. The method of claim 12, wherein the successive data items are selected on the output side of the adaptive equalizer, the selecting including:

if the symbol-based coefficient shifting is permitted in a range from −k to +k (k is a natural number), delaying a last 2k of symbol data items among M of the symbol data items output from M parallel filters of the adaptive equalizer by one clock; and
selecting M successive symbol data items from a total of the 2k delayed symbol data items and the M parallel symbol data items currently output from the M parallel filters according to the shifting state of the tap coefficients.

14. The method of claim 12, wherein the successive data items are selected on the input side of the adaptive equalizer, the selecting including:
if coefficient shifting is permitted in a range from −k to +k (k is a natural number), and if n-times oversampled data items (n is a natural number) are input to M parallel filters of the adaptive equalizer, delaying a last n×2k of sample data items and N−n sample data items among n×M sample data items by one clock, and selecting (n×M+N−n) successive sample data items from a total of the (n×2k+N−n) delayed sample data items and the n×M sample data items currently input to the M parallel filters according to the shifting state of the tap coefficients.

15. The method of claim 12, wherein the shifting includes:
discarding a tap coefficient having overflowed on one side of a sequence of the tap coefficients due to the symbol-based shifting of the tap coefficients and inserting zero on another side.

16. The method of claim 12, wherein the calculation of the weighted center includes calculating a weighted center of electric power levels of the tap coefficients or a maximum amplitude position of the tap coefficients.

17. The method of claim 12, further comprising:
extracting at the adaptive equalizer a first transmission polarization component and a second transmission polarization component from an inputted first reception polarization component and second reception polarization component using a plurality of N-tap filtering devices,
wherein the calculation of the weighted center of the tap coefficients is performed for each of the N-tap filtering devices.

18. The method of claim 17, wherein the extraction of the first transmission polarization component includes:
extracting the first transmission polarization component from the first reception polarization component at a first of the N-tap filtering devices;
extracting the first transmission polarization component from the second reception polarization component at a second of the N-tap filtering devices; and
adding the first transmission polarization components extracted by the first and second N-tap filtering devices, and
wherein extraction of the second transmission polarization component includes:
extracting the second transmission polarization component from the first reception polarization component at a third of the N-tap filtering devices;
extracting the second transmission polarization component from the second reception polarization component at a fourth of the N-tap filtering devices; and
adding the second transmission polarization components extracted by the third and the fourth N-tap filtering devices.

19. The method of claim 12, further comprising:
extracting at the adaptive equalizer a first transmission polarization component and a second transmission polarization component from an inputted first reception polarization component and an input second reception polarization component using a plurality of N-tap filtering devices, wherein the calculation of the weighted center of the tap coefficients is performed for each of the first transmission polarization component and the second transmission polarization component.

20. A tap coefficient correcting method performed in an adaptive equalizer of a digital coherent optical receiver, comprising:

in an initial training period prior to actual data transmission, calculating a weighted center of tap coefficients of a filter having a prescribed number of taps; and shifting the tap coefficients of the filter on a symbol data basis so as to bring the weighted center of the tap coefficients closer to a tap center determined by the number of taps by minimizing a difference between a position of the calculated weighted center of the tap coefficients and the tap center.

* * * * *